(12) United States Patent
Wobbrock et al.

(10) Patent No.: US 7,729,542 B2
(45) Date of Patent: Jun. 1, 2010

(54) USING EDGES AND CORNERS FOR CHARACTER INPUT

(75) Inventors: Jacob O. Wobbrock, Lake Oswego, OR (US); Brad A. Myers, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1265 days.

(21) Appl. No.: 10/811,761

(22) Filed: Mar. 29, 2004

(65) Prior Publication Data

US 2004/0196256 A1    Oct. 7, 2004

Related U.S. Application Data

(60) Provisional application No. 60/460,296, filed on Apr. 4, 2003.

(51) Int. Cl.
*G06K 9/00* (2006.01)
(52) U.S. Cl. ............... 382/187; 382/186; 382/189; 345/17; 345/161; 345/179
(58) Field of Classification Search ............... 382/187
See application file for complete search history.

(56) References Cited

U.S. PATENT DOCUMENTS

| 400,141 | A |   | 3/1889 | Stone |   |
|---|---|---|---|---|---|
| 1,231,821 | A |   | 7/1917 | Walton |   |
| 3,108,254 | A | * | 10/1963 | Dimond | ............... 382/187 |
| 3,142,039 | A | * | 7/1964 | Irland et al. | ............ 379/93.19 |
| 3,199,078 | A |   | 8/1965 | Gaffney, Jr. et al. |   |
| 3,253,258 | A |   | 5/1966 | Hughes |   |
| 3,559,170 | A | * | 1/1971 | Barnes | ............... 235/441 |

(Continued)

FOREIGN PATENT DOCUMENTS

WO    WO 00/72300 A1 * 11/2000

OTHER PUBLICATIONS

T.L. Dimond, Devices for Reading Handwritten Characters, Proceedings of the Eastern Computer Conference, pp. 232-237, Bell Telephone Labs, Inc., Murray Hill, N.J.

(Continued)

*Primary Examiner*—Sath V Perungavoor
(74) *Attorney, Agent, or Firm*—Jones Day; Edward L. Pencoske

(57) ABSTRACT

A new unistroke text entry method for handheld or wearable devices is designed to provide high accuracy and stability of motion. The user makes characters by traversing the edges and diagonals of a geometric pattern, e.g. a square, imposed over the usual text input area. Gesture recognition is accomplished not through pattern recognition but through the sequence of corners that are hit. This means that the full stroke path is unimportant and the recognition is highly deterministic, enabling better accuracy than other gestural alphabets. This input technique works well using a template with a square hole placed over a touch-sensitive surface, such as on a Personal Digital Assistant (PDA), and with a square boundary surrounding a joystick, which might be used on a cellphone or game controller. Another feature of the input technique is that capital letters are made by ending the stroke in a particular corner, rather than through a mode change as in other gestural input techniques. Because of the rules governing abstracts, this abstract should not be used to construe the claims.

60 Claims, 5 Drawing Sheets

U.S. PATENT DOCUMENTS

| | | | |
|---|---|---|---|
| 3,676,848 | A | 7/1972 | Hall |
| 3,704,343 | A | 11/1972 | Howard |
| 3,835,453 | A | 9/1974 | Narayanan |
| 3,903,502 | A | 9/1975 | Moss |
| 3,909,785 | A | 9/1975 | Howells |
| 3,996,557 | A | 12/1976 | Donahey |
| 4,005,400 | A * | 1/1977 | Engdahl .................... 341/5 |
| 4,047,010 | A | 9/1977 | Perotto |
| 4,070,649 | A | 1/1978 | Wright |
| 4,139,837 | A | 2/1979 | Liljenwall et al. |
| 4,149,164 | A * | 4/1979 | Reins et al. ................. 345/531 |
| 4,159,471 | A * | 6/1979 | Whitaker .................... 345/168 |
| 4,184,147 | A | 1/1980 | Seelbach |
| 4,199,751 | A | 4/1980 | Piguet |
| 4,241,409 | A | 12/1980 | Nolf |
| 4,338,673 | A * | 7/1982 | Brown ........................ 345/469 |
| 4,477,797 | A * | 10/1984 | Nakagiri ....................... 341/5 |
| 4,495,646 | A | 1/1985 | Gharachorloo |
| 4,542,526 | A | 9/1985 | Satoh |
| 4,561,105 | A | 12/1985 | Crane et al. |
| 4,633,243 | A * | 12/1986 | Bresenham et al. ........... 345/17 |
| 4,695,828 | A | 9/1987 | Yamamoto |
| 4,724,423 | A | 2/1988 | Kinoshita |
| 4,727,357 | A | 2/1988 | Curtin |
| 4,771,268 | A | 9/1988 | Sone |
| 4,905,007 | A | 2/1990 | Rohm |
| 4,953,225 | A | 8/1990 | Togawa |
| 4,985,929 | A | 1/1991 | Tsuyama |
| 5,010,579 | A | 4/1991 | Yoshida |
| 5,022,086 | A | 6/1991 | Crane et al. |
| 5,125,039 | A | 6/1992 | Hawkins |
| 5,140,645 | A * | 8/1992 | Whitaker ..................... 382/184 |
| 5,194,852 | A | 3/1993 | More et al. |
| 5,214,428 | A * | 5/1993 | Allen .......................... 382/313 |
| 5,297,216 | A * | 3/1994 | Sklarew ....................... 382/189 |
| 5,303,312 | A * | 4/1994 | Comerford et al. ........... 382/182 |
| 5,305,433 | A * | 4/1994 | Ohno .......................... 345/469 |
| 5,313,527 | A | 5/1994 | Guberman et al. |
| 5,365,598 | A | 11/1994 | Sklarew |
| 5,467,407 | A | 11/1995 | Guberman |
| 5,521,986 | A * | 5/1996 | Curtin et al. ................. 382/187 |
| 5,596,656 | A * | 1/1997 | Goldberg ..................... 382/186 |
| 5,764,794 | A | 6/1998 | Perlin |
| 5,832,113 | A * | 11/1998 | Sano .......................... 382/187 |
| 6,031,525 | A | 2/2000 | Perlin |
| 6,044,174 | A | 3/2000 | Sinden |
| 6,057,845 | A | 5/2000 | Dupouy |
| 6,185,333 | B1 | 2/2001 | Arai |
| 6,208,757 | B1 | 3/2001 | Sinden |
| 6,212,297 | B1 | 4/2001 | Sklarew |
| 6,212,298 | B1 | 4/2001 | Yoshii |
| 6,215,901 | B1 | 4/2001 | Schwartz |
| 6,366,697 | B1 | 4/2002 | Goldberg et al. |
| 6,493,464 | B1 | 12/2002 | Hawkins et al. |
| 6,498,601 | B1 | 12/2002 | Gujar et al. |
| D472,265 | S * | 3/2003 | Chepaitis ..................... D18/24 |
| 6,597,345 | B2 * | 7/2003 | Hirshberg .................... 345/168 |
| 6,647,145 | B1 * | 11/2003 | Gay ............................ 382/187 |
| 6,754,387 | B1 * | 6/2004 | Bera ............................ 382/181 |
| 2003/0006956 | A1 * | 1/2003 | Wu et al. ..................... 345/156 |
| 2003/0076306 | A1 * | 4/2003 | Zadesky et al. ............. 345/173 |
| 2003/0234766 | A1 * | 12/2003 | Hildebrand .................. 345/168 |
| 2004/0145576 | A1 * | 7/2004 | Zondag ....................... 345/173 |
| 2004/0263487 | A1 * | 12/2004 | Mayoraz et al. ............. 345/173 |
| 2005/0088415 | A1 * | 4/2005 | To ............................... 345/168 |

OTHER PUBLICATIONS

David Goldberg and Cate Richardson, Touch-Typing With a Stylus, Interchi '93, Apr. 24-29, 1993, pp. 80-87, Xerox Corporation, Palo Alto, CA.

I. Scott Mackenzie and R. William Soukoreff, Text Entry for Mobile Computing: Models and Methods, Theory and Practice, Human-Computer Interaction, 2002, pp. 147-198, vol. 17.

Poika Isokoski and Roope Raisamo, Device Independent Text Input: A Rationale and an Example, Dept. of Computer Science, 2000, pp. 76-83, Univ. of Tampere, Finland.

I. Scott Mackenzie and S. Zhang, The Immediate Usability of Graffiti, Dept. of Computing & Information Science, 1997, pp. 129-137, Univ. of Guelph, Canada.

Ken Perlin, Quikwriting: Continuous Stylus-based Text Entry, Dept. of Computer Science, 1998, pp. 215-216, New York Univ., New York.

Shumin Zhai, Michael Hunter and Barton A. Smith, Performance Optimization of Virtual Keyboards, Human-Computer Interaction, 2002, pp. 89-129, vol. 17.

Fleetwood, M.D., et al.; An evaluation of text-entry in Palm OS—Graffiti and the virtual keyboard; Proceedings of the Human Factors and Ergonomics Society 46th Annual Meeting (HFES '02); Sep. 30-Oct. 4, 2002; Human Factors and Ergonomics Society; Baltimore, Maryland; pp. 617-621.

Plamondon, R., Privitera, C.M.; The segmentation of cursive handwriting: An approach based on off-line recovery of the motor-temporal information; IEEE Transactions on Image Processing; 1999; 8(1); pp. 80-91.

Tappert, C.C., Cha, S.-H.; English language handwriting recognition interfaces; In Text Entry Systems: Mobility, Accesibility, Universality; I.S. MacKenzie and K. Tanaka-Ishii (eds); 2007; San Francisco: Morgan Kaufmann; pp. 123-138.

* cited by examiner

USING EDGES AND CORNERS FOR CHARACTER INPUT

This application claims priority from U.S. application Ser. No. 60/460,296 entitled Using Edges and Corners for Character Input, filed Apr. 4, 2003, the entirety of which is hereby incorporated by reference.

STATEMENT REGARDING FEDERALLY SPONSORED RESEARCH

This work was supported by NSF contract no. UA-0308065. The federal government may have certain rights in this invention.

BACKGROUND

This invention relates to methods and systems for entering characters into a handheld or wearable computerized device, such as a handheld computer also called a "personal digital assistant," a cell phone, a watch, a computer game console, or the like.

Text input is difficult on handheld and wearable computerized devices. Handheld devices include cell phones, two-way pagers, game console controllers, and "Personal Digital Assistants" (PDAs), including those made by Palm, Inc. and the devices which run Microsoft's WindowsCE operating system. In the future, we expect that wearable devices such as wristwatches and other small computerized devices will need good text entry methods. Today, PDAs and two-way pagers primarily use on-screen "soft" keyboards, handwriting recognition, tiny physical keyboards used with the thumbs, or special gestural alphabets such as Graffiti from Palm, Inc. or Jot from Communication Intelligence Corporation (CIC). Cell phones primarily use multiple taps on the standard 12-key number pad, possibly combined with a prediction technique such as T9. Game controllers primarily use a joystick to iterate through characters, or else to select letters from a keyboard displayed on the television screen.

On-screen "soft" keyboards are small and the keys can be difficult to acquire. They also consume precious screen space. To address these problems, some researchers have attempted to discover the "optimal" soft keyboard. Zhai, S., Hunter, M., Smith, B. A. "Performance optimization of virtual keyboards", Human-Computer Interaction 17, Lawrence Erlbaum, 2002. pp. 229-269. Many soft keyboard designs exist, and an overview is provided in MacKenzie, I. S., Soukoreff, R. W. "Text entry for mobile computing: Models and methods, theory and practice", Human-Computer Interaction 17, Lawrence Erlbaum, 2002, pp. 147-198. On-screen "soft" keyboards also require the user to focus attention on the keyboard rather than on the output, resulting in errors related to increased focus-of-attention. This is particularly a problem when the user does not want to look at the handheld device, such as when walking, driving, or producing output that appears on a separate display, such as on a television or desktop monitor. MacKenzie, I. S., Zhang, S., "The immediate usability of Graffiti", Proc. Graphics Interface '97. Canadian Information Processing Society, 1997. pp. 129-137. Gestural text entry techniques, such as Graffiti and Jot, also do not completely solve the problem of text input. They can be difficult to learn and error-prone. Early gestural text entry techniques have a history dating back to as early as 1957. Diamond, T. L. "Devices from reading handwritten characters", Eastern Computer Conference, 1957, pp 232-237. Unistroke methods, for example, separate characters during text entry by pen-down/pen-up sequences. The term "unistroke" originated from the alphabet by the same name-Unistrokes-developed at Xerox PARC [Goldberg, D., Richardson, C., "Touch typing with a stylus", proc. INTERCHI '93, pp 80-87] and U.S. Pat. No. 5,596,656, January, 1997, Goldberg. But Unistrokes did not resemble real letters, and for this reason, they were difficult to learn and memorize. Graffiti from Palm, Inc. carried the unistroke concept to the masses by making the character forms similar to handwritten forms that proved much easier to learn and memorize. A later unistroke research effort discovered that the easiest gestures to make on a variety of devices were in the four cardinal directions, so a "device independent" alphabet called MDITIM was created using them. Isokoski, P., "A minimal device-independent text input method", unpublished thesis, University of Tempere, Finland, 1999.

In contrast to unistrokes, continuous gesture techniques do not require lifting the stylus between characters, which can improve the speed of input. Rather than making character forms, the user moves the stylus through different regions, and segmentation between letters is accomplished by exiting one region and entering another. An example is Quikwriting [Perlin, K. Quikwriting, "Continuous stylus-based text entry", Proc. UIST '98. ACM Press, 1998. pp. 215-216.], described in U.S. Pat. No. 6,031,525, February, 2000, Perlin. These methods generally have the same increased focus of attention problems as soft keyboards because they require constant visual attention.

Entering text using the standard 12-key number pad or using tiny keyboards is slow and unnatural, and techniques such as T9 help only a little.

All of these techniques are especially difficult to use in a number of circumstances, such as when the user is walking, riding a frequently-stopping bus, or not looking at the screen ("eyes free" entry). Even expert users of these techniques will make many errors that they must correct using the backspace key or backspace stroke.

People with motor impairments have a particularly difficult time entering text using these existing technologies. People with Cerebral Palsy, Muscular Dystrophy, and Parkinson's Disease, for example, often lose their gross motor control and arm strength before losing their fine motor control and may therefore still be able to use a stylus or joystick. But they often do not have sufficient accuracy of movement to hit the tiny keys of an on-screen keyboard. The gestural text entry techniques may be impossible for people with motor impairments due to tremor and fatigue, which dramatically affect a user's ability to make smooth, accurate, and controlled movements. Another result of tremor is that many users "bounce" the stylus on the screen, triggering unwanted modes and unwanted characters in today's gestural systems. A more stable means of text entry is necessary for users of handheld devices who have motor impairments.

Able-bodied users would also benefit from more stable means of text entry. Since PDAs are designed to be used "on the go," many situations arise where added stability would be beneficial: riding a bus, walking, or annotating slides during a presentation while standing.

Another disadvantage for all users of the gestural and on-screen keyboard techniques is that they require a relatively large touch-sensitive surface, which can significantly increase the expense of creating a handheld device.

Therefore, the need exists for a new method of text entry for handheld and wearable devices that provides greater accuracy and stability of motion.

SUMMARY OF THE INVENTION

The present invention is a new unistroke text entry method for handheld and wearable devices designed to provide high accuracy and stability of motion. The user makes characters by traversing the edges and diagonals of a shape (e.g., a square) imposed over the usual text input area. The present invention employs a high percentage of strokes in the four cardinal directions. But unlike other unistroke techniques, the present invention is not a pattern recognizer, and does not depend on the whole path of the character for recognition. Thus, moderate wiggle (e.g., caused by hand tremor) in the stroke does not deter high recognition rates.

The present invention improves the quality of text entry using physical edges. Physical edges offer many desirable properties. Applying pressure against an edge while entering a character provides greater stability (decreased movement variability and movement offset), greater speed (the ability to move quickly yet remain on the target line), higher accuracy (targets along an edge or in a corner are easier to acquire), and tangible feedback (no longer is visual feedback the only means of self-correction during movement, as tactile feedback is available).

This invention exploits these benefits of edges in a text entry technique, and avoids other factors such as cognitive or mnemonic difficulties. We call this input technique Edge-Write. It relies heavily on edges and corners, both interactively and algorithmically.

BRIEF DESCRIPTION OF THE DRAWINGS

For the present invention to be easily understood and readily practiced, preferred embodiments will now be described, for purposes of illustration and not limitation, in which.

DETAILED DESCRIPTION OF THE INVENTION

Figure 1:
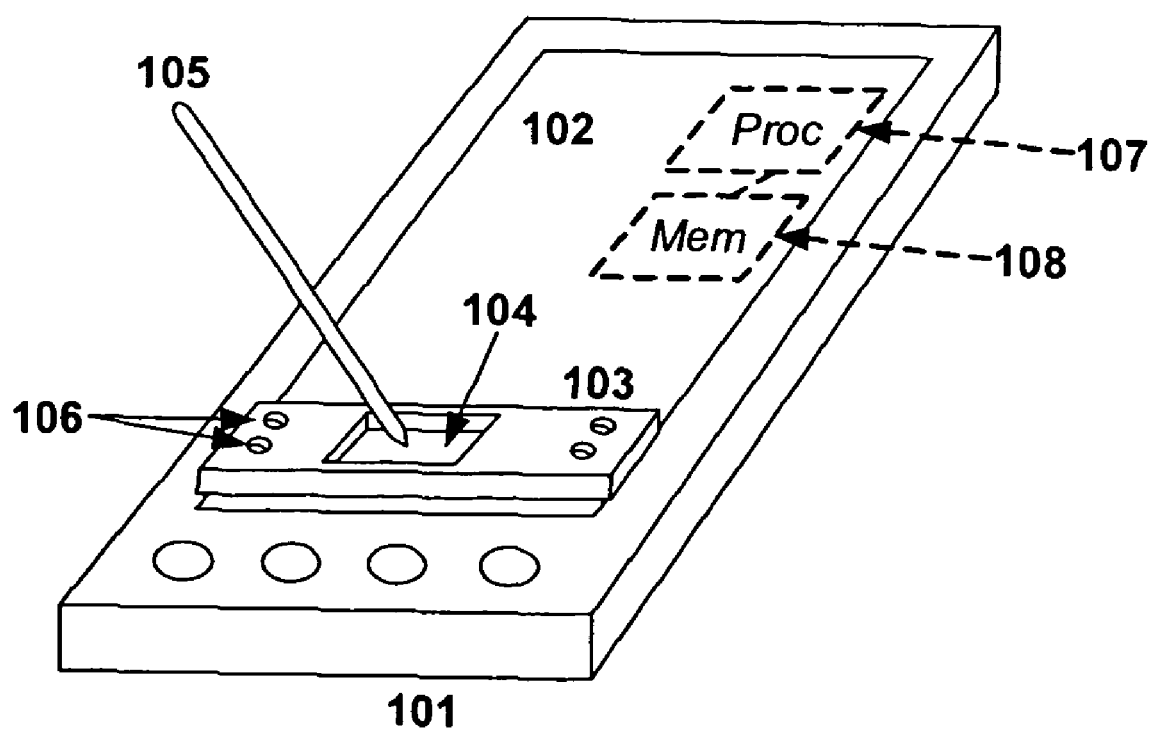
FIG. 1 is the preferred embodiment of the invention on a PDA with a template with a square hole.

FIG. 1 shows one embodiment of the present invention where these edges are imposed on the text entry area of a PDA by means of a transparent plastic template 103 with, in this embodiment, a square hole 104. All text entry is performed inside this hole. Our experimental results show that extensive iteration of the character set has made the character forms highly guessable and easy to learn, maintaining a low cognitive workload for the user.

In particular, we found that when compared to Graffiti, the present invention was 18% more accurate during text entry for able-bodied users formerly unfamiliar with either technique. This benefit came without a significant cost in speed. Users with motor impairments (such as Parkinson's, Cerebral Palsy, and Muscular Dystrophy) succeeded at using the present invention but were largely unable to use Graffiti.

The present invention can be used as a stylus-based unistroke input technique. To make a character, the user places the stylus 105 down inside the square hole 104 (FIG. 1), moves the stylus in a specific pattern along edges and diagonals into corners of the square, and lifts upon completion of the character. A processor 107 is responsive to the input and to a memory 108 which carries software for implementing the character recognition method of the present invention.

One difference between the preferred embodiment of the present invention and gestural techniques like Graffiti is that all stylus motion in the present invention occurs within a confined geometric shape, for example, a small plastic square hole that, in the preferred embodiment, is 1.3 cm on a side (1.69 cm$^2$). This square hole bounds the input area with firm physical edges.

A second difference between the present invention and gestural techniques like Graffiti is that recognition does not depend on the path of movement, nor is the recognizer a pattern matcher. Instead, recognition only depends on the order in which the corners are hit. The advantages of this include:

Users can "wiggle" or slide in moderation and this does not degrade recognition.

The recognition algorithm is elegant and fast, as hit-testing corner areas is an operation capable of being performed rapidly even by a weak processor.

Users can teach the system their own custom gestures with one example, as training sets for a pattern matching algorithm are not necessary.

From a design standpoint, it is easy to iterate character forms, as changing them requires changing only a corner sequence value. No sets of ideal points or paths are necessary.

A third difference between the present invention and Graffiti is the reduction of modes. In particular, the present invention uses no shift, caps lock, or extended shift modes. The only mode in the present invention is a punctuation mode (which is not required for a period, as it is such a common character).

Figure 2:
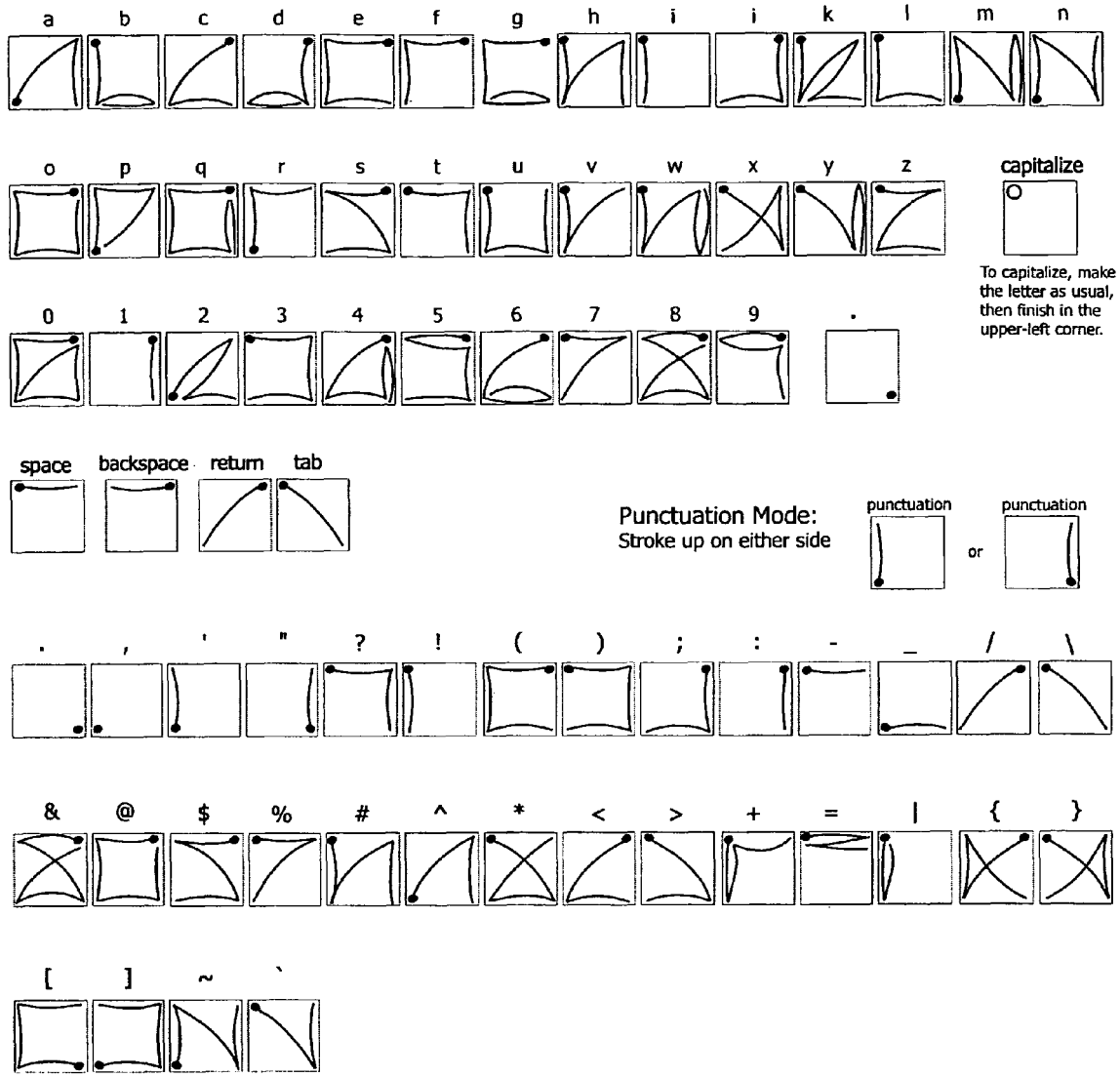
FIG. 2 is an example character chart showing one form of each of the characters using the present invention.

FIG. 2 shows an embodiment of a character chart for primary character forms according to the present invention. In addition, multiple alternate forms exist for nearly every character (not shown). These character forms are a product of hours of user testing and extensive iteration. In user testing, most subjects discovered and used several of the alternate character forms despite their absence from the chart, suggesting a high degree of guessability for the EdgeWrite character forms.

Though many of the characters look vaguely like their handwritten counterparts, the mnemonic power of these characters comes less from their appearance and more from their "feel." One person noted this when, after entering 20 phrases using the present invention, he said, "I don't remember any of the pictures in my mind, but I still feel them in my hand."

As in some other gestural alphabets, some letters resemble lowercase forms, while others resemble uppercase forms. All letters produce a lowercase form unless the capitalization suffix stroke is appended to the usual letter stroke. The suffix stroke may simply be a motion to, for example, the upper-left corner (think "up," to "make it big") after the regular letter form is made but before lifting the stylus. Note that, by design, no letters finish in the upper-left corner, allowing for this suffix stroke to be appended. In user studies, subjects had no trouble with this method of capitalization.

Another thing to notice about the character chart (FIG. 2) is that it is representational, not literal. We faced a design challenge in depicting the strokes on paper, as many characters have strokes that pass over the same edge more than once. If such a "double pass" is drawn literally, then the result is merely a single line. We chose to arc the paths into the intended corners. These arcs make it possible to depict a double pass over the same edge. In the present invention, all movements are, in the ideal case, straight lines. As mentioned, however, straight line motion is not necessary for recognition, only hitting the corners in the proper order.

If we define a "segment" to be a straight line stroke between two vertices (or corners), then for gestures made inside a closed shape with v vertices, the number of possible character forms using s segments is given by the formula:

$$\text{forms} = \sum_{i=0}^{s} v \cdot (v-1)^i$$

This formula treats a tap at a vertex as a legal stroke, and assumes that the same corner is never used twice in a row.

For the preferred embodiment using a square, v=4. If s=0, meaning we use no segments, we see from the formula that we have 4 possible forms available to us: a tap in each of the square's four corners. With 1 segment, there are 16 possible forms (4+4×3), with 2 segments we get 52 forms, and with 3 segments we get 160 forms. Thus, there is a wealth of forms to choose from with relatively few segments.

The character chart in FIG. 2 represents 100 characters: 26 lowercase letters, 26 uppercase letters via the capitalization suffix stroke, 10 digits, 4 white space characters, 2 punctuation mode-setters, and 32 punctuations. We do not count period twice, as it is the same form in and out of punctuation mode. Not pictured in the chart are the four directional arrow keys, which are also implemented, making for 104 unique characters in one embodiment of the current set of characters.

The average primary character form as shown in FIG. 2 has 2.47 segments in it, excluding capitalization. If we include capitalization and its associated suffix stroke, this average increases to 2.84. The average number of segments per character for the whole character set, including all alternates and capitals, is 3.49. Incidentally, the whole character set in the preferred embodiment contains 228 forms. Note that these values exclude the punctuation mode setting stroke required for some characters.

Because we have 102 characters excluding punctuation mode-set, the forms equation above dictates that we must use 3 segments for at least some of the characters—50 of them to be exact. If we designed the character set with the fewest number of possible segments and no modes, and with only one form for each character, then the average number of segments per character in that set would be 2.39. So even with high learnability and guessability, the average segments per primary character according to the present invention (2.84) is not much higher than this theoretical lower bound (2.39). For entry without capitals (e.g., instant messaging), the average is even closer (2.47). This is due, in part, to the use of a punctuation mode, allowing for the reuse of certain character forms. It is also due to the choice of minimal-length character forms, without sacrificing their mnemonic feel.

The corners began naively as points rather than areas, and this proved to be inadequate, as users rarely hit the exact pixel in the corners. This was because users held their styluses at various angles. An angled stylus 105 impacts the edge of the plastic template hole 104 a few millimeters above its tip, causing the tip to jut a few pixels into the square even when the stylus is flush against the edge (FIG. 1).

After we increased the corner size to an appreciable area, two other problems emerged. Once moving, users would accidentally hit corners, particularly when making a diagonal stroke, as in an "s." But if the corners were made too small, users would often fail to hit them on pen-down, particularly in the backspace stroke (across the top or bottom edge from right to left). It seemed we needed large corners for when the stylus went down, but then small corners thereafter.

The next step in our design process added precisely this (FIG. 6): We inflated the corners until the stylus was detected within one of them, and then deflated all of them while the stylus was moving. Thereafter, users were able to easily hit the corners on pen-down and also avoid hitting them accidentally while moving the stylus.

An observation during a user study prompted the next iteration on the corners. A right-handed user with a chronic wrist injury held the stylus at a fairly shallow angle relative to the PDA screen. The result was that the elevated edge of the plastic square prevented the tip of the stylus from getting close to the right side of the square. We provided extra corner area along the x-axis for the dominant-hand side of the square to account for users who hold their styluses at steep angles. A property of this iteration was that it did not negatively impact users who held their styli more vertically.

Figure 6:
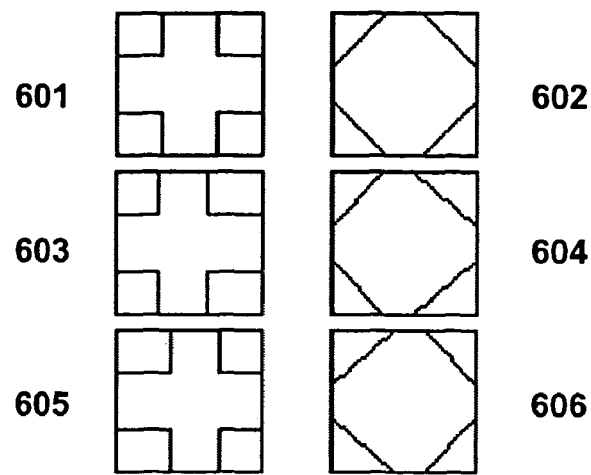
FIG. 6 shows how the corner areas are implemented in the preferred embodiment on a PDA.

An alternative embodiment would use other shapes for the corner regions. One example is to use triangular corner regions rather than rectangles. FIG. 6 shows the design using rectangles changing to triangles 601-602, and providing extra corner area on the dominant-hand side for both right-handed 603-604 and left-handed 605-606 users. This design was shown to lessen accidental corner hits even more. Many other alternatives are possible. For example, inflation/deflation can be modified so that the inflated and deflated corners are both triangles.

Though Graffiti is popular, it also has problems. We took some lessons from studies of Graffiti in an effort to alleviate some of its problems, or at least to avoid reproducing them. Certain letters in Graffiti have specific problems. For example, many people handwrite an n beginning at the top-left of the letter and initially going down. In Graffiti, this almost always results in an h. The present invention supports an optional initial down stroke on letters that commonly have them: b, d, m, n, p, q, and r. Similarly, many people make a down stroke at the end of u, and in Graffiti this almost always produces an h or w. The present invention allows this down stroke on u. Graffiti also often produces a u when novices make a v but forget to add an unnatural serif on the right. The present invention avoids this u-v confusion, as every form is more than just subtly different from every other form.

Another problem for novices is confusion between the x and k in Graffiti, as these are mirror images of each other. The present invention removes this similarity by redesigning the k so that it starts at the top-left, where a handwritten k starts, not at the top-right, where a Graffiti k starts. The preferred embodiment does leave the top-right k as an alternate form for current Graffiti users.

As mentioned above, motor impaired users sometimes "bounce" inadvertently on the screen. One embodiment of the present invention has characters that are entered by taps in the corners. We removed all of these except period (.) to reduce the likelihood of entering an accidental mode or character by inadvertent "bounces" on the screen.

In the present invention, we differentiate position based on the known location of the square. Hence, we can tell i from l even though they are the same stroke because they are on different edges. This is a powerful concept, as it allows for input in a very small area. It also means we do not need separate regions of the screen devoted to letters, numbers, capitals (e.g., as Jot does), and so on.

Figure 9:
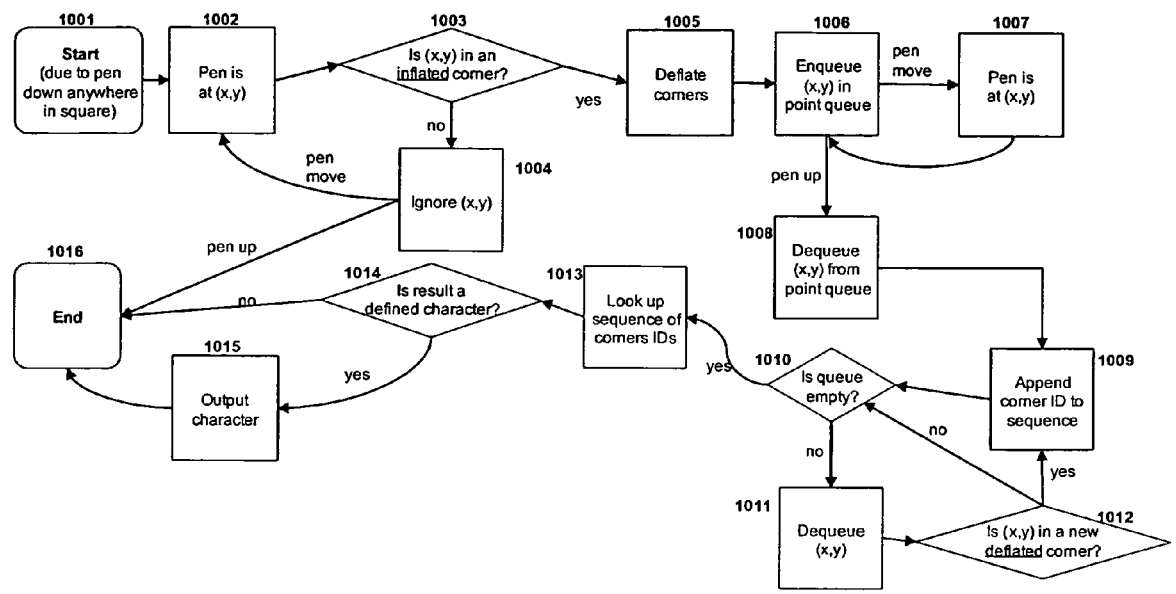
FIG. 9 is a flow chart summarizing one embodiment of a recognition algorithm.

The implementation of the preferred embodiment for the present invention enables fast character recognition. With reference to FIG. 9, the recognizer does nothing until it detects a pen-down event 1001. If the down event is in an inflated corner 1003, then it deflates the corners 1005, and begins queuing up all the points over which the stylus moves until the stylus is lifted 1006-1007. No recognition or filtering is done during the stylus movement to maximize the number of movement points queued. Once the stylus is lifted, the recognizer notes the first corner where the recognition started 1008, and then loops through the point queue and hit-tests the points against the deflated corner regions, collecting the sequence of corners 1009-1012. The result of this loop is a 32-bit integer value representing the sequence in which the corners were hit. This integer is assembled efficiently: when a new corner is hit, the existing integer sequence is bit-shifted to the left and the new corner is "appended" with bitwise-OR. This sequence is then sent to a lookup function 1013 that finds the character corresponding to the corner sequence, if any 1014, by comparing the determined sequence of corner hits to a library of stored sequences of corner hits which is representational of a printed alphabet. If a result is a defined character, the character is output at 1015 and the process ends at 1016.

Another embodiment eliminates the enqueuing of the points while the mouse is moving 1005-1008 by testing the points for being in corners 1003, 1012 while the pen is moving, and then queuing only the corner ids. This results in simpler code, but code which takes more processor time for each input point.

This recognition algorithm is fast in linear time O(n), and it could be implemented on a weak processor with a poor digitizer sampling rate and a noisy digitization of stylus coordinates. Anecdotally, it was not possible for us to move the stylus faster than the present invention could recognize the stroke on a Palm Vx, which polls its screen for the pen every 20 ms.

Another aspect of the present invention is implemented not in software but in plastic in the preferred embodiment. The template 103 is important for the present invention to work well, and designing and fabricating this plastic piece involved just as iterative a process as developing the software. We have numerous prototypes. Some are small and sit on the PDA's screen. We found this to work fine for able-bodied people, but users with motor impairments sometimes put pressure with their fingers on the template, causing it to press against the screen and confuse the digitizer. We designed another model to avoid putting pressure on the screen 102. It sits on top of the Palm chassis and therefore cannot touch the screen (as shown in FIG. 1).

Figure 7:
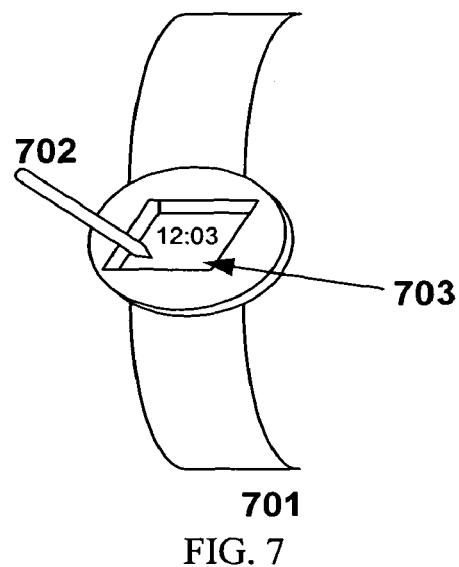
FIG. 7 shows another embodiment on a wrist watch.
Figure 8:
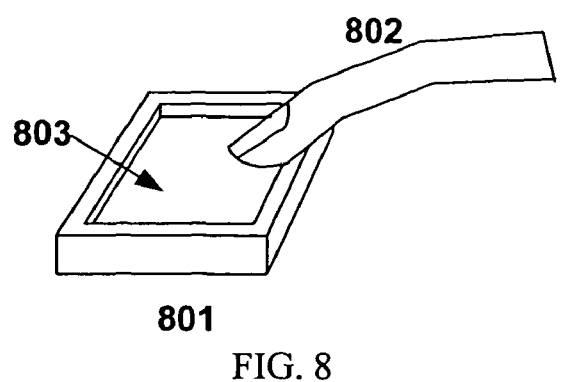
FIG. 8 shows another embodiment on a touch pad, which uses a finger in place of a stylus.

As an alternative embodiment, FIG. 7 shows that the square hole 703 might be on the faceplate of a wrist watch 701 which has a touch-sensitive screen. Then the user could use a stylus 702 to enter text on the watch using the character set of the present invention. Another alternative embodiment is shown in FIG. 8, where a slightly larger touch sensitive surface 801 is used, and the pointing is performed with a finger 802 on the surface 803 instead of a stylus. The finger can feel the edges and corners. The touch sensitive surface might be mounted on the front or back of a mobile device, or somewhere in an automobile to enable text entry while driving. In all cases, the same alphabet is used (for example, as shown in FIG. 2).

The present invention's recognition technology and methodology for generating character recognition data can be implemented on other types of electronic devices, be they handheld or wearable, including those without the luxury of a fully-digitized touch screen. All that is required are four corner sensors and either one other sensor or a timer. These sensors could be crude: they do not have to determine coordinates, only whether the stylus is in contact with them or not. Thus, the invention is a reliable character recognizer without being a pattern-matcher that depends on the whole path of movement.

Figure 3:
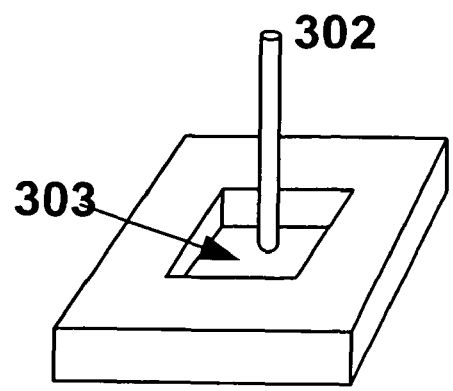
FIG. 3 is another embodiment of the invention as a joystick in a square mounting area.

Another advantage of the present invention is that it can be implemented using a simple, low-cost joystick instead of using a stylus on a touch-sensitive screen. For example, the joystick 301 in FIG. 3, shown as a freestanding joystick although it need not be, has a stick 302 that is constrained to move within a square mounting area 303. The same character forms, shown for example in FIG. 2, can be made by moving the stick 302 within the square mounting area 303. Pressing down on a button on top of the stick 302, or a separate button, could be used to signal the beginning and end of strokes. Another way to segment strokes is to wait until there is no movement for a predetermined period of time (such as 100 milliseconds). Alternatively, when a self-centering joystick is used, segmentation is possible by detecting when the stick snaps-to-center, which can be sensed by watching the joystick for two consecutive points in the center.

Figure 4:
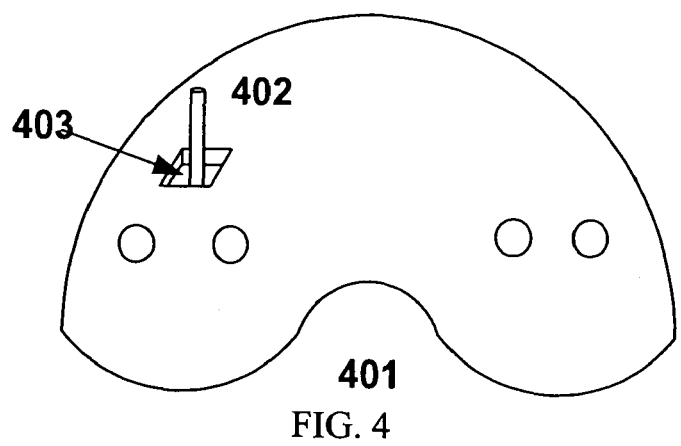
FIG. 4 is another embodiment of the invention as a joystick mounted on a game controller.
Figure 5:
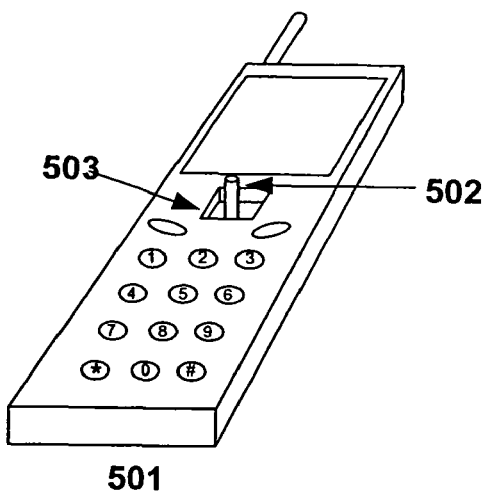
FIG. 5 is another embodiment of the invention as a joystick mounted on a mobile phone.

As shown in FIG. 4, a joystick 402 could be mounted on a game controller 401, or as shown in FIG. 5, a joystick 502 might be part of a mobile phone 501. It will be understood by those skilled in the art that this joystick could be mounted on any other kind of handheld device, such as a pager, a remote control, a calculator, etc. The recognition algorithm and character forms could remain the same in all cases.

Another advantage of the present invention is that it is very easy to allow the users to create their own forms for characters. A user can go into a special mode for doing customizations, and make the desired pattern only once; the system then records and remembers the sequence of corners that were hit. Then the user can specify the result of performing that pattern, which may be the entry of a character, or it may be a shortcut for entering a sequence of characters or for giving a command to the system (e.g., to launch a favorite application). In this way, the users can customize the text entry technique to their own preferences. This is an advantage over existing unistroke techniques (such as Graffiti), since most techniques do not allow user-defined strokes. If they did, they would require numerous training examples, not just one, since they are full-path pattern matchers.

While the invention has been particularly shown and described with reference to the preferred embodiments thereof, it will be understood by those skilled in the art that various changes in form and detail may be made therein without departing from the spirit and scope of the invention. Although numerous advantages of the present invention are described, it is not necessary that the subject matter set forth in the following claims embody all of the advantages described

What is claimed is:

1. A character recognition method, comprising:
   using a processor to perform the following method;
   queuing continuous path data made by traversing edges and diagonals and into corners within a confining geometric shape constraining an input device to less than the input device's total area;
   searching the queued continuous path data to generate a sequence of corner hits, where a corner hit corresponds to a corner defined by said geometric shape;
   identifying a character based on said sequence of corner hits independently of the remainder of the continuous path data;
   wherein each of said sequences of corner hits defines a single stroke, and wherein each single stroke is representative of one of a letter, number, punctuation or mode; and
   identifying a letter character as being upper case when said stroke representative of said character ends in a common predetermined corner and lower case when said stroke does not end in said common predetermined corner.

2. The method of claim 1 wherein said input device is a touch sensitive surface, said method additionally comprising detecting loss of contact with the touch sensitive surface, said loss of contact indicating the end of a stroke.

3. The method of claim 1 additionally comprising detecting the actuation of a switch, said actuation indicating the end of a stroke.

4. The method of claim 1 wherein said input device is a joystick, said method additionally comprising detecting lack of movement of the joystick for a predetermined period of time, said lack of movement indicating the end of a stroke.

5. The method of claim 4 wherein said detecting lack of movement includes detecting the joystick at two identical positions within said predetermined period of time.

6. The method of claim 5 wherein said positions correspond to a center point.

7. The method of claim 1 wherein said identifying a character is comprised of comparing the determined sequence of corner hits to data representative of a plurality of stored sequences of corner hits, selecting one of the stored sequences of corner hits based on said comparing, and outputting a character linked to said selected one of said stored sequences of corner hits.

8. The method of claim 7 wherein said comparing includes comparing the determined sequence of corner hits to a library of stored sequences of corner hits which is representational of a printed alphabet.

9. The method of claim 7 additionally comprising changing the stored sequences of corner hits that are linked to a character.

10. The method of claim 9 wherein said changing includes providing one example of a sequence of corner hits and the character to which that sequence is to be linked.

11. The method of claim 1 wherein said corner hits include corner area hits, said method additionally comprising varying the size of the corner areas while said continuous path data is being queued.

12. The method of claim 11 wherein said varying the size includes decreasing the size of only certain corner areas.

13. The method of claim 11 wherein said varying the size includes decreasing the size of certain corner areas more than the size of other corner areas.

14. The method of claim 1 wherein said corner hits include corner area hits, said method additionally comprising varying the shape of the corner areas while said continuous path data is being queued.

15. A letter character recognition method, comprising:
    using a processor to perform the following method;
    queuing continuous path data made by traversing edges and diagonals and into corners within a confining geometric shape constraining an input device to less than the input device's total area;
    searching the queued continuous path data to generate a sequence of corner hits within a single unistroke, where a corner hit corresponds to a corner defined by said geometric shape;
    identifying a letter character based on said sequence of corner hits independently of the path therebetween; and
    identifying said letter character as being upper case when said single unistroke defining the character ends in a common predetermined corner and lower case when said unistroke does not end in the common predetermined corner;
    wherein each of said sequences of corner hits defines a single stroke, and wherein each single stroke is representative of one of a letter, number, punctuation or mode.

16. The method of claim 15 additionally comprising detecting loss of contact with a touch sensitive surface, said loss of contact indicating the end of the unistroke.

17. The method of claim 15 additionally comprising detecting the actuation of a switch, said actuation indicating the end of the unistroke.

18. The method of claim 15 additionally comprising detecting lack of movement of a joystick for a predetermined period of time, said lack of movement indicating the end of the unistroke.

19. The method of claim 18 wherein said detecting lack of movement includes detecting the joystick at two identical positions within said predetermined period of time.

20. The method of claim 19 wherein said positions correspond to a center point.

21. The method of claim 15 wherein said identifying a letter character is comprised of comparing the determined sequence of corner hits to data representative of a plurality of stored sequences of corner hits, selecting one of the stored sequences of corner hits based on said comparing, and outputting the letter character linked to said selected one of said stored sequences of corner hits.

22. The method of claim 21 wherein said comparing includes comparing the determined sequence of corner hits to a library of stored sequences of corner hits which is representational of a printed alphabet.

23. The method of claim 21 additionally comprising changing the stored sequences of corner hits that are linked to a letter character.

24. The method of claim 23 wherein said changing includes providing one example of a sequence of corner hits and the letter character to which that sequence is to be linked.

25. The method of claim 15 wherein said corner hits include corner area hits, said method additionally comprising varying the size of the corner areas while said single unistroke is created.

26. The method of claim 25 wherein said varying the size includes decreasing the size of only certain corner areas.

27. The method of claim 25 wherein said varying the size includes decreasing the size of certain corner areas more than the size of other corner areas.

28. The method of claim 15 wherein said corner hits include corner area hits, said method additionally comprising varying the shape of the corner areas while said single unistroke is created.

29. A method of generating a stroke, comprising:
using a processor to perform the following method;
queuing continuous path data made by traversing edges and diagonals and into corners within a confining geometric shape constraining an input device to less than the input device's total area;
searching the queued continuous path data to generate a sequence of corner hits independently of the remainder of the continuous path data, with each corner hit in said sequence of corner hits corresponding to a corner defined by said geometric shape;
receiving information indicative of the end of each stroke;
wherein each of said sequences of corner hits defines a single stroke, and wherein each single stroke is representative of one of a letter, number, punctuation or mode; and
identifying a letter character as being upper case when said stroke representative of said character ends in a common predetermined corner and lower case when said stroke does not end in said common predetermined corner.

30. The method of claim 29 wherein said input device is a touch sensitive surface, and wherein said information includes information generated by lifting an object out of contact with the touch sensitive surface.

31. The method of claim 29 wherein said information includes information generated by activating a switch.

32. The method of claim 29 wherein said input device is a joystick, and wherein said information includes information generated by returning the joystick to a predetermined position for a predetermined period of time.

33. A computer readable memory carrying software which, when executed, performs a method comprising:
queuing continuous path data made by traversing edges and diagonals and into corners within a confining geometric shape constraining an input device to less than the input device's total area;
searching the queued continuous path data to generate a sequence of corner hits, where a corner hit corresponds to a corner defined by said geometric shape;
identifying a character based on said sequence of corner hits independently of the remainder of the continuous path data;
wherein each of said sequences of corner hits defines a single stroke, and wherein each single stroke is representative of one of a letter, number, punctuation or mode; and
identifying a letter character as being upper case when said stroke representative of said character ends in a common predetermined corner and lower case when said stroke does not end in said common predetermined corner.

34. The memory of claim 33 wherein said input device is a touch sensitive surface, said method additionally comprising detecting loss of contact with the touch sensitive surface, said loss of contact indicating the end of a stroke.

35. The memory of claim 33 additionally comprising detecting the actuation of a switch, said actuation indicating the end of a stroke.

36. The memory of claim 33 wherein said input device is a joystick, said method additionally comprising detecting lack of movement of the joystick for a predetermined period of time, said lack of movement indicating the end of a stroke.

37. The memory of claim 36 wherein said detecting lack of movement includes detecting the joystick at two identical positions within said predetermined period of time.

38. The memory of claim 37 wherein said positions correspond to a center point.

39. The memory of claim 33 wherein said identifying a character is comprised of comparing the determined sequence of corner hits to data representative of a plurality of stored sequences of corner hits, selecting one of the stored sequences of corner hits based on said comparing, and outputting a character linked to said selected one of said stored sequences of corner hits.

40. The memory of claim 39 wherein said comparing includes comparing the determined sequence of corner hits to a library of stored sequences of corner hits which is representational of a printed alphabet.

41. The memory of claim 39 additionally comprising changing the stored sequences of corner hits that are linked to a character.

42. The memory of claim 41 wherein said changing includes providing one example of a sequence of corner hits and the character to which that sequence is to be linked.

43. The memory of claim 33 wherein said corner hits include corner area hits, said method additionally comprising varying the size of the corner areas while said continuous path data is being queued.

44. The memory of claim 43 wherein said varying the size includes decreasing the size of only certain corner areas.

45. The memory of claim 43 wherein said varying the size includes decreasing the size of certain corner areas more than the size of other corner areas.

46. The memory of claim 33 wherein said corner hits include corner area hits, said method additionally comprising varying the shape of the corner areas while said continuous path data is being queued.

47. A computer readable memory carrying software which, when executed, performs a method, comprising:
queuing continuous path data made by traversing edges and diagonals and into corners within a confining geometric shape constraining an input device to less than the input device's total area;
searching the queued continuous path data to generate a sequence of corner hits within a single unistroke, where a corner hit corresponds to a corner defined by said geometric shape;
identifying a letter character based on said sequence of corner hits independently of the path therebetween; and
identifying said letter character as being upper case when said single unistroke defining the character ends in a common predetermined corner and lower case when said unistroke does not end in the common predetermined corner;
wherein each of said sequences of corner hits defines a single stroke, and wherein each single stroke is representative of one of a letter, number, punctuation or mode.

48. The memory of claim 47 additionally comprising detecting loss of contact with a touch sensitive surface, said loss of contact indicating the end of the unistroke.

49. The memory of claim 47 additionally comprising detecting the actuation of a switch, said actuation indicating the end of the unistroke.

50. The memory of claim 47 additionally comprising detecting lack of movement of a joystick for a predetermined period of time, said lack of movement indicating the end of the unistroke.

51. The memory of claim 50 wherein said detecting lack of movement includes detecting the joystick at two identical positions within said predetermined period of time.

52. The memory of claim 51 wherein said positions correspond to a center point.

53. The memory of claim 47 wherein said identifying a letter character is comprised of comparing the determined sequence of corner hits to data representative of a plurality of stored sequences of corner hits, selecting one of the stored sequences of corner hits based on said comparing, and outputting the letter character linked to said selected one of said stored sequences of corner hits.

54. The memory of claim 53 wherein said comparing includes comparing the determined sequence of corner hits to a library of stored sequences of corner hits which is representational of a printed alphabet.

55. The memory of claim 53 additionally comprising changing the stored sequences of corner hits that are linked to a letter character.

56. The memory of claim 55 wherein said changing includes providing one example of a sequence of corner hits and the letter character to which that sequence is to be linked.

57. The memory of claim 47 wherein said corner hits include corner area hits, said method additionally comprising varying the size of the corner areas while said single unistroke is created.

58. The memory of claim 57 wherein said varying the size includes decreasing the size of only certain corner areas.

59. The memory of claim 57 wherein said varying the size includes decreasing the size of certain corner areas more than the size of other corner areas.

60. The memory of claim 47 wherein said corner hits include corner area hits, said method additionally comprising varying the shape of the corner areas while said single unistroke is created.

* * * * *